March 13, 1956 J. E. VAN ACKER 2,737,854
METHOD AND MEANS OF PRODUCING INVOLUTE TOOTH PROFILES
Filed Oct. 8, 1954 2 Sheets-Sheet 1

INVENTOR.
JOSEPH E. VAN ACKER
BY
Harold F. Scribner
ATTORNEY

March 13, 1956  J. E. VAN ACKER  2,737,854
METHOD AND MEANS OF PRODUCING INVOLUTE TOOTH PROFILES
Filed Oct. 8, 1954  2 Sheets-Sheet 2

*INVENTOR.*
JOSEPH E. VAN ACKER
BY
Harold F. Scribner
ATTORNEY

United States Patent Office 2,737,854
Patented Mar. 13, 1956

2,737,854

METHOD AND MEANS OF PRODUCING INVOLUTE TOOTH PROFILES

Joseph E. Van Acker, New Vernon, N. J., assignor to Gould & Eberhardt, Inc., Irvington, N. J., a corporation of New Jersey Application October 8, 1954, Serial No. 461,159

8 Claims. (Cl. 90—1.6)

This invention relates to an improved method and means for producing properly formed gear teeth and more particularly to a method of producing involute tooth profiles devoid of errors unavoidably incident to conventional generating processes.

At the present time most gears produced are initially hobbed and thereafter shaved in an effort to improve tooth form and profile. There are, however, certain errors attending most generating processes that are reflected in the work which the subsequent shaving process tends to follow and repeat and, therefore, cannot correct.

The generating process comprises, essentially, a rolling of the blank and tool together in a manner similar to the rolling action between two gears. During such action involute tooth profiles are developed on successive teeth of the blank. If, however, the rolling action is not precisely uniform as to time or if the tool is not precision set or contains an error in one or more of its teeth, the profile produced will be found to contain regions that are beyond or under the desired involute surface. In appearance, such regions of swellings and depressions resemble waves which investigation and study have found to be of calculable frequency and lengths. In the case of the waves being due to a hob error, the wave crests and troughs follow the axis on a spur gear and the helix on a helical gear. A work-motion error wave, such as may be produced by a hobbing-machine index-worm error, produces a similar wave that follows the axis on all gears; in the case of helical gears, the error wave runs diagonally off the tooth.

In determining the cause for such error waves on the tooth flanks it was found with hobbing processes, for example, that if the hob contained an error in its helix it would cut a crest on one side of a tooth and a trough on the other, not radially equidistant, but occurring on the tooth flanks of adjacent teeth on the simultaneous lines of action of the teeth of the hob with the blank. If the hob has a single thread every revolution brings a succeeding tooth of the blank into the same relative position with identical teeth of the hob and the error wave is repeated on every tooth of the gear. The wavelength is ordinarily relatively short but its length will vary according to the number of teeth on the gear and the pressure angle. If the number of teeth is high the lines of action at any instant will pass through a number of teeth, whereas, if the number of teeth is low the lines of action will pass through relatively few teeth. Similarly, if the pressure angle is low more teeth are involved than if the pressure angle is high. When a two-thread hob is used the wavelength of the error wave is doubled, its magnitude amplified, and is phase-shifted 180° on successive teeth.

The foregoing applies primarily to hobbing processes and errors that originate in the hob or in the hob-drive train. If the error is a work-motion error, i. e., a timing error in the work index train, the error wave form usually is not identical on successive teeth. Such an error wave is produced on the tooth flanks at angular work-motion intervals equal to the angle between successive teeth of the index wormgear.

As indicated above waves produces in the tooth profile originate from two sources primarily—machine errors and hob errors. Machine-error waves may be produced by any generating process such as hobbing, shaping using a circular cutter, or planing using a rack-type tool, and hob-error waves may be produced only by hobbing processes. The effects of such errors may be superposed on one another but they show up, to a greater or lesser degree, on the tooth profiles of the generated gear along the simultaneous lines and planes of action of tool and blank.

When the generated gear having such wave errors in the tooth profiles is subsequently shaved the shaving cutter, which is generally speaking complementary to the gear, tends to follow the error wave laid down by the hob. That is, the positive swelling on one flank on one line of action is complemented by a negative swelling on the other flank on the other line of action and the shaving teeth meet the swell and the hollow simultaneously with the inevitable result of being crowded over to one side. Hence, the teeth of the shaved gear embodies to a large degree the same error waves as the generated gear.

A primary aim of this invention is to render available a method and apparatus for finishing involute teeth whereby and wherewith error waves generated in the tooth form may be effectively and efficiently eliminated to the end of producing tooth profiles more precisely approaching the desired profile than has been possible heretofore. Most gears produced today are standardized as having a definite pressure angle (14½°, 20°, 25°, etc.) and a definite pitch, and likewise the gear-cutting tool used to generate the gear is constructed with a pressure angle and pitch corresponding to those specified for the gear. For purposes of illustration it may be assumed that a hob is the generator and the slant of the sides of its rack-like teeth fixes the pressure angle, and the thread spacing, i. e., the distance from one tooth to the next, establishes the pitch of the gear. A normal to the slanted side of a hob tooth at its pitch point, fixes the base pitch of the gear, and from this base pitch and corresponding base circle the involute form of the teeth originates. Any given gear, therefore, may have but one base circle and the size of this circle is a function of the pressure angle and pitch diameter, namely, the cosine of the pressure angle times the pitch diameter equals the base diameter. Hence, any normal to an involute is tangent to the base circle of that involute, and this is the line of action of a pair of mating tooth profiles as it passes thru their point of contact and is the conventional line of action of the generating tool in developing the involute profile.

The pitch circle of a gear is an imaginary circle around the blank usually about half-way the depth of the tooth and it is customary to use the pitch circle as the basis for tooth spacing, i. e., circular pitch in the case of a gear and linear pitch in the case of a rack. Its acceptance by the industry is fairly universal, however, it is but an arbitrarily selected circle, for any given gear may have a number of different pitch circles provided corresponding changes in circular pitch and pressure angle are made and taken into consideration. For example, a charactristic of an involute is that any normal to the involute at any point on the profile is a tangent to the base circle, and hence the pitch circle may be regarded as having a radius that will pass through any of such points. Correspondingly the circular pitch will change according to the rule: pitch dia./base dia. × base pitch-circular pitch. When the circular pitch is arbitrarily changed in this manner, so also does the pitch of the rack (generating tool, or hob) change and when the pitch is changed a proportionate change must be made in the pressure angle since a tangent to the involute at the selected pitch point and a radial line thru that point define the pressure angle. Accordingly, any gear has a pressure angle whose cosine equals base dia./pitch dia. which means that one may control pressure angle by changing pitch diameter and circular pitch in respect to any standard gear. And it also means that a standard gear may be cut with a modified-addendum hob, i. e., one having a different pressure angle, if the pitch and pressure angle of the hob correspond with the selected circular pitch and pitch diameter of the gear. This also means that since pressure angle of the hob need not be equal to the pressure angle (line of action) of operation, one has a measure of control over precisely where the wave-error crests and troughs may be caused to fall on the flanks and faces of the gear teeth. Therefore, and inasmuch as any gear may have any number of concentric pitch circles, such gear automatically embodies any number of different circular pitches and pressure angles. Hence, such a gear may be produced by any generating tool having a pitch and pressure angles corresponding to a preselected pitch and pressure angle of the gear. It follows, therefore, that the error-wave pattern laid down by a hob, for example, is a functional characteristic of the pressure angle of that hob and that the error wave will be cyclically repeated on the teeth of the blank.

Heretofore it was the customary practice to hob the teeth with, for example, a 14½° pressure-angle hob and later to shave the gear with a 14½° pressure-angle shaving cutter. Hob error waves conceivably were diminished but were far from being eradicated. According to the present invention it is now proposed to generate the involute teeth with a system based upon a given pitch diameter, circular pitch, and pressure angle, and subsequently to shave the teeth with a shaving cutter based upon a system having an intentionally different pitch diameter, circular pitch, and pressure angle. Accordingly, if the generator produces swells and hollows on opposite tooth profiles on the simultaneous lines of action of the generator, by using a shaving tool constructed upon a system that differs from the hob by an amount that will cause the shaving cutter to straddle the wave crests on opposite flanks on the different simultaneous lines of action of the shaving cutter, the laterally acting cutting forces are substantially balanced and the error waves are quickly and efficiently removed. From the above it will be seen that the pressure-angle changes between the generator and shaving cutter must be substantial to produce the result envisaged and I have found in the case of hob-produced error waves that a suitable and effective pressure-angle change is 360° T/4N or an odd multiple thereof where T is the number of threads in the hob and N the number of teeth in the gear. A suitable and effective pressure-angle change for machine error waves may be derived from the formula 360°/4X where X equals the number of revolutions of any rotating part, e. g., hob arbor, index-worm shaft, etc., per revolution of the work axis.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 of the drawings represents a section of a hob and gear in meshed relation.

Figure 6:
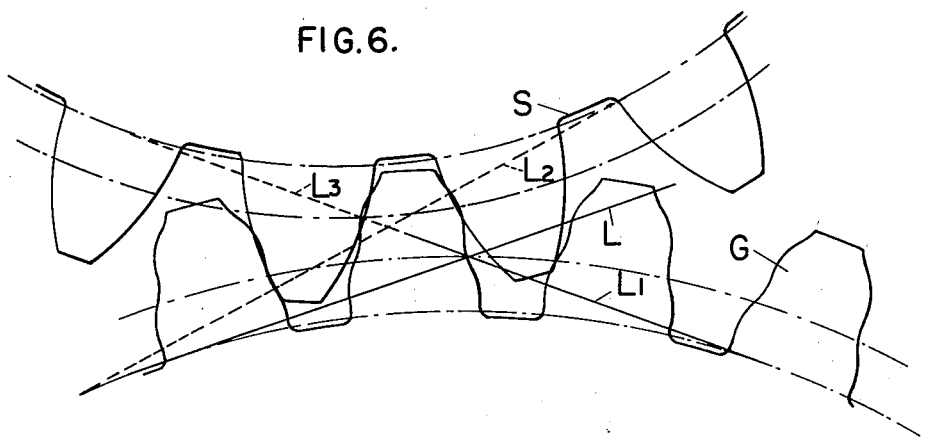

Fig. 6 is a section of a gear having error waves on the tooth profiles characteristic of the pitch and pressure angle of its generator and a shaving cutter having an intentionally modified pitch and pressure angle calculated to bring the simultaneous lines of action out of coincidence to the extent of forcing the shaving cutter to straddle the crests of the waves on the gear-tooth profiles and eliminate them.

Figure 7:
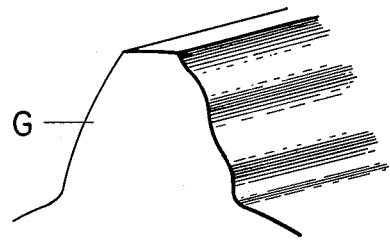

Fig. 7 is a perspective view of a portion of one flank of a gear tooth of a helical gear having a hob-error wave, or of a spur gear having a machine error wave or hob-error wave.

Figure 8:
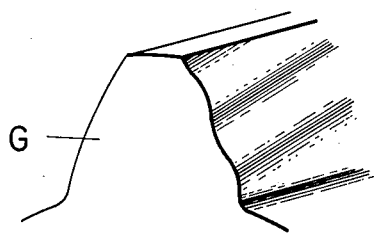

Fig. 8 is a perspective view of a portion of a helical gear illustrating a machine-error wave on but one flank and its diagonal path relative to the direction of the tooth.

Figure 9:
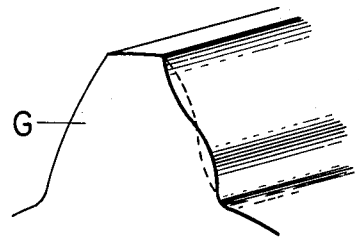

Fig. 9 illustrates an error wave produced by a double-thread hob, the wave in full line being produced by one thread of the hob on one tooth and the dotted line representing the wave on the next adjacent tooth that is produced by the other thread of the hob.

Figure 1:
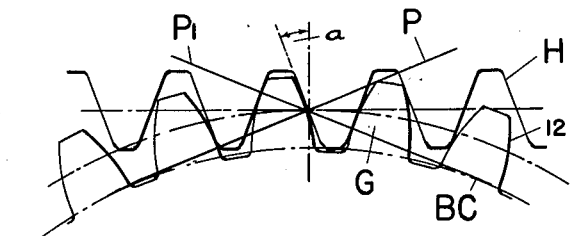
Figure 2:
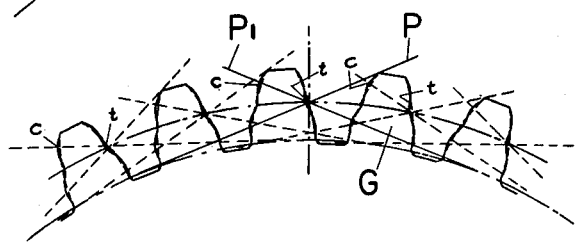
Fig. 2 is a section of the gear cut by the hob of Fig. 1 on which corresponding simultaneous lines of action have been indicated on several teeth and the depressions and swellings (exaggerated) that are formed on those lines of action.

Referring more particularly to Fig. 1 of the drawing the letter H represents the rack-type section of a conventional hob and the letter G a section of the gear that has been generated by such a hob. The involute profiles of the teeth 12 of the gear rise from a base circle BC. A line P tangent to the base circle and normal to the slanted side of the rack-type tooth of the hob at the point of intersection of the line P with the pitch line and pitch circle of the rack and gear, respectively, defines a line of action between the rack and gear. The angle the side of the rack tooth makes with a radial line passing through the pitch point determines the pressure angle. A similar line of action P1 exists on the other side of the tooth and these simultaneous lines of action cross at the pitch point. In Fig. 2 the simultaneous lines of action P and P1, and their counterparts indicated in dotted lines, form a uniform pattern of error waves around the gear.

As the tooth forms are generated, the points of contact of the sides of the hob teeth with the sides of the gear teeth fall along these lines of simultaneous action and if, for example, one or more teeth of the hob are out of line as a result of hob runout or periodic lead errors, those teeth will develop a slight hollow $t$ in the flank of each tooth of the gear. The result is hollows produced on the flanks of the adjacent teeth at and during the same period of time and motion between hob and gear. While the trough $t$ is produced in one flank a crest $c$ is formed on the opposite flank on the lines of action with the result of producing, in aggregate, a wave in the profile.

Figure 3:
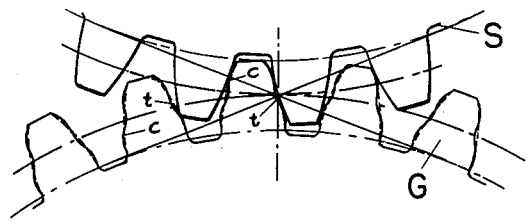
Fig. 3 is a section of a gear and a shaving cutter illustrating how the shaving cutter follows the wave pattern laid down by the hob and shows in particular how a swelling on one side of the gear teeth can push the shaving cutter into a hollow on the other side of the gear teeth.

Now, when such a gear is shaved with a shaving cutter of the same pitch and pressure angle as the gear, as is the conventional practice, the shaving cutter's teeth meet the high and low regions $c$ and $t$ of the tooth flanks simultaneously with the inevitable result of being crowded over to one side, that is the crest on one flank tends to force the shaving cutter's tooth over into the hollow in the other flank, and instead of producing an improved tooth profile on the gear the shaving cutter is caused to follow the pattern laid down by the hob. This effect is represented in Fig. 3 wherein S is the shaving cutter and G is the gear. It will be understood that in Figs. 1 thru 6 the amplitudes of the waves are exaggerated for illustration purposes, and the desired tooth profiles indicated in dotted lines for comparison.

When the error wave is caused by a work-motion error, such as might result from an error in the work-drive train or an error in the index worm, the work may be caused to be advanced or retarded ever-so-little at cyclically recurring intervals and since the generating tool, whether it is a hob, a circular cutter of a gear-shaping machine, or a rack tool of a gear-planing machine, does not respond to the work-motion error but performs its cutting action quite undisturbed, thereby resulting in the creation of crests and troughs in the tooth flanks along the simultaneous lines of action at cyclically recurring periods. Accordingly, when gear teeth are generated by any of the processes that conventionally employ tools having pitch and pressure angles corresponding to the gear, an error wave in the tooth profile traceable to the tool or to the drive train, is more than likely produced on the gear teeth and which conventional shaving processes do not remove or correct.

A method has now been found, however, of removing the error wave in tooth profiles by a shaving process which according to this invention consists intentionally in so modifying the addendum of either the shaving cutter or the generating tool or both that the pair of simultaneous lines of action of the generator and gear relative to those of the shaving cutter and gear are never coincident at any point or period in the shaving operation.

Figure 4:
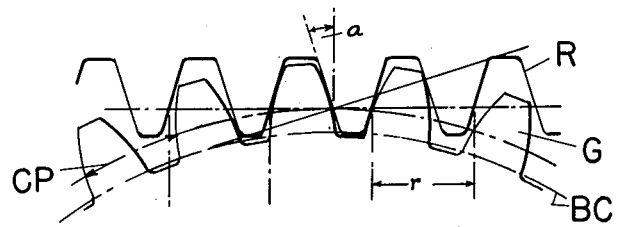
Fig. 4 is a section of a gear and hob or rack cutter of a given pitch and pressure angle.
Figure 5:
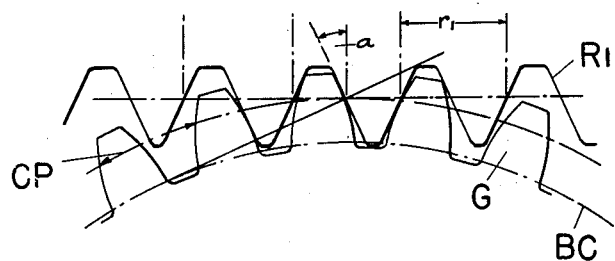
Fig. 5 is a section of the same gear as in Fig. 4 properly meshed with a hob or rack cutter whose pitch and pressure angle have been intentionally altered from that of Fig. 4 to illustrate how an involute gear may have one base circle and a number of arbitrarily selected pitch circles.

A preferred method and means for accomplishing the result envisaged may be understood by referring to Figs. 4 and 5 in which G is the gear and R and R1 two hobs or rack cutters of different pitches $r$ and $r1$, respectively, each properly meshed with the same gear. For illustration purposes the gear G in Figs. 4 and 5 is of the same pitch and number of teeth as the gear G in Fig. 1 but the pitch circle of the gear in Fig. 4 is smaller than the pitch circle of the gear in Fig. 1, whereas, the pitch circle of the gear in Fig. 5 is larger than the pitch circle of the gear in Fig. 1. All gears in Figs. 1, 4 and 5 have identical base circles BC and identical base pitches, but different circular pitches CP. By referring to Figs. 4 and 5 it will be seen that a tangent to the base-pitch circle intersects the pitch point relatively low in Fig. 4 and relatively high in Fig. 5 and establishes different pressure angles $a$ on each gear. And as explained above, since it is the pressure angle that determines the angularity of the simultaneous lines of action between a rack and a gear, or between a generating tool and a gear, it will readily be seen that the location of the error waves in the crests and hollows produced in the tooth flanks, may be caused to assume different radial locations on the teeth of the respective gears. Hence, if a gear of a selected pitch is generated with a tool or on a machine that produces characteristic error waves in the tooth profiles along the simultaneous lines of action, the crests of such error waves may be efficiently removed by shaving with a cutter having an addendum intentionally and sufficiently modified to cause the lines of simultaneous action of the shaving tool and the gear to fall substantially out of coincidence with the corresponding lines of action produced by the generating tool and the gear to the extent necessary to compel the shaving cutter to straddle the error wave crests on opposite flanks and remove the bulges.

The foregoing condition is illustrated in Fig. 6 in which G is the gear and S the shaving tool. The lines L and L1 represent the simultaneous lines of action between the gear and its generating tool and the lines L2 and L3 the corresponding simultaneous lines of action between a modified-addendum shaving cutter and the same gear. In this figure the gear has been revolved an angular distance sufficient to bring lines L1 and L3 into coincidence and lines L and L2 an appreciable number of degrees apart. An exaggerated error wave has been indicated on the tooth flanks of the gear, the crests and hollows of which fall on the simultaneous lines of action L and L1, whereas the simultaneous lines of action L2 and L3 between the shaving cutter and the gear are intentionally displaced an amount sufficient to cause the teeth of the shaving cutter to engage opposed crests on the gear teeth simultaneously. By so intentionally modifying the addendum of either the shaving tool or the generating tool, or both (as illustrated in Fig. 6) an amount sufficient to cause an appreciable displacement of the simultaneous lines of action between generator and gear and those between the shaving tool and gear, the error waves produced during the generating are readily removed during the subsequent shaving. The pressure-angle difference required to produce the desired results must, of course, be a substantial angular change accompanied by a corresponding change in circular pitch. An optimum pressure-angle change to effect removal of hob-error waves may be obtained from the formula $360° T/4N$ where T is the number of threads in the hob and N is the number of teeth in the gear, it being understood that that pressure-angle change need not be precise for practical manufacturing purposes. A more general formula, however, is $360°/4X$ where X is the number of revolutions of any rotating part such as the hob arbor, index worm shaft, etc. per revolution of the work axis. This latter formula, which likewise need not be exact, enables one to make sufficient pressure-angle change to remove hob-error waves and/or machine-error waves by the subsequent shaving process. It is immaterial, as seen above, whether the change be made wholly to the generating tool i. e., hob, rotary shaping cutter, or rack tool of a planer, or to the shaving cutter, or is apportioned between the generating tool and the shaving tool provided corresponding changes in the circular pitches of one or both are made.

Figs. 7, 8 and 9 represent tooth portions of gears with exaggerated waves illustrated on but one flank. Fig. 7 represents a typical wave form that may be produced on teeth of a helical gear by an error in the hob, or a typical wave form that may be produced on a spur gear by an error in the machine or a hob error, whereas, Fig. 8 illustrates a representative form and direction of a machine-error wave on a helical gear.

Fig. 9 typifies the wave produced by a double-thread hob. In such a case the waves are out-of-phase on alternate teeth by 180°. All such error waves may, however, be removed in accordance with the method and means explained above which consists essentially of generating of the gear teeth with a tool having its cutting teeth constructed upon a system employing a given pressure angle as its base and subsequently finishing the gear teeth with a tool constructed upon a system having a substantially different pressure angle as its base, the pressure angle difference being great enough to cause the shaving cutter to meet the crests on opposite sides of the gear teeth simultaneously and thereby produce a balancing of forces that tend to hold the cutter undeviatingly on its course.

While the invention has been explained with reference primarily to the use of a shaving cutter having a pressure angle differing from the gear by an amount sufficient to bring the simultaneous lines of action out of coincidence so that crests are encountered simultaneously it is contemplated that the method of finishing involute profiles may also be practiced with a lapping or burnishing tool constructed and operated as and for the purposes herein described.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. The method of producing involute tooth profiles on gear teeth free of error waves incident to the hobbing process which consists in hobbing the involute teeth in a blank with a hob constructed on a tooth system having an arbitrarily selected circular pitch and pressure angle intended for the finished gear and thereafter shaving the teeth of the gear with a shaving cutter constructed on a system having an arbitrarily selected circular pitch and pressure angle that differs from the circular pitch and pressure angle of the hob by an amount sufficient to cause adjacent teeth of the shaving cutter simultaneously to straddle the crests of the error waves produced on the tooth profiles by the hob on the opposite flanks of the gear teeth and remove such crests whereby to produce the desired involute profile on the teeth of the gear.

2. The method of producing involute tooth profiles on gear teeth free of error waves incident to a hobbing process which consists in forming the involute teeth in a blank with a hob having a selected circular pitch and pressure angle and thereafter shaving the teeth of the hobbed gear with a shaving cutter constructed on a system in which the circular pitch and pressure angle is intentionally different from the circular pitch and pressure angle of the hob to cause adjacent teeth of the shaving cutter simultaneously to engage the crests of the error waves produced on the tooth profiles by the hob on the opposite flanks of the gear teeth and remove such crests whereby to produce involute profiles on the teeth of the gear free of hob-error waves.

3. The method of finishing involute tooth profiles on gear teeth free of error waves produced as a consequence of an error existing in the generating hob which consists in shaving the teeth of the gear with a shaving cutter constructed on a system having a circular pitch and pressure angle that differs from the circular pitch and pressure angle of the generating hob according to the formula $360° \, T/4N$ where T is the number of threads in the hob and N is the number of teeth in the gear to cause adjacent teeth of the shaving cutter simultaneously to engage the wave crests on the opposite flanks of the gear teeth and remove such crests during the finishing operation and produce corrected tooth profiles on the teeth of the gear.

4. The method of removing machine-error waves produced on the flanks of hobbed gear teeth as an incident to the hobbing process which consists in finishing the teeth of the gear with a toothed tool constructed on a system having a preselected circular pitch and pressure angle that differs from the circular pitch and pressure angle of the tool used in generating the gear teeth in accordance with the formula $360°/4X$ in which X equals the number of revolutions of any rotating part in the hobbing machine to which the error wave produced on the tooth profile is attributable per revolution of the axis of the gear to thereby cause the finishing tool to operate on lines of action different from the lines of action that existed between the generating tool and the gear so as to cause the finishing tool to engage the crests of the machine-error waves on opposite flanks of the gear teeth simultaneously and remove such crests during the finishing operation.

5. The method of producing involute tooth profiles on hobbed gear teeth free of error waves incident to the hobbing process which consists in hobbing the gear teeth of standard pitch in a blank with a hob constructed on a tooth system having an arbitrarily selected pitch and pressure angle that differs from the circular pitch and pressure-angle standard of the gear, said hob producing an unwanted error wave form on the tooth profiles, and thereafter shaving the teeth of the gear with a shaving cutter constructed on a tooth system in which the circular pitch and pressure angle corresponds to the circular pitch and pressure angle of the gear so that adjacent teeth of the shaving cutter are caused simultaneously to engage opposite flanks of the teeth of the gear along lines of action that differ in angularity from the lines of action between hob and the gear so as to cause the shaving cutter to engage opposite crests of such error waves on the gear simultaneously and remove such crests during the finishing operation.

6. The method of finishing involute tooth profiles on gear teeth free of error waves which consists in hobbing gear teeth of standard pitch in a blank with a hob constructed on a tooth system having a pitch and circular pitch and pressure angle corresponding to the pressure angle of the gear and as an incident to the hobbing process producing unwanted error waves on the tooth profiles at locations which are characteristic of the pitch and pressure angle of the hob and thereafter shaving the teeth of the gear with a shaving cutter constructed on a tooth system in which the circular pitch and pressure angle differs from the circular pitch and pressure angle of the gear so as to cause adjacent teeth of the shaving cutter simultaneously to engage opposite flanks of the teeth of the gear along lines of action which at any given period of time are out of coincidence with the lines of action between the generating tool sufficiently to cause the shaving cutter to engage opposite wave crests on the tooth profiles simultaneously and remove the crests during the finishing operation.

7. The method of finishing involute tooth profiles on gear hobbed teeth free of error waves incident to the hobbing process which consists in hobbing the involute teeth in a blank with a hob constructed on a tooth system having an arbitrarily selected pitch and pressure angle for producing involute teeth of a known circular pitch and pressure angle on the gear and thereafter finishing the teeth of the gear with a lapping tool constructed on a system having an arbitrarily selected circular pitch and pressure angle that differs from the circular pitch and pressure angle of the hob by an amount sufficient to cause adjacent teeth of the lapping tool simultaneously to straddle the wave crests that are produced on the tooth profiles by the hob on the opposite flanks of the gear teeth and remove such crests whereby to produce the desired involute profile on the teeth of the gear.

8. The method of finishing involute tooth profiles on gear teeth produced by a hobbing process which includes the step of lapping the teeth of the gear with a lapping tool constructed on a system having an arbitrarily selected circular pitch and pressure angle that differs from the circular pitch and pressure angle of the hob that produced the gear teeth by an amount sufficient to cause adjacent teeth of the lapping tool simultaneously to straddle the wave crests that are produced on the tooth profiles by the hob on the opposite flanks of the gear teeth and remove such crests whereby to produce the desired involute profile on the teeth of the gear.

References Cited in the file of this patent

UNITED STATES PATENTS

| | | |
|---|---|---|
| 1,948,071 | Hofmann et al. | Feb. 20, 1934 |
| 2,249,252 | Mentley | July 15, 1941 |
| 2,423,593 | Gasser | July 8, 1947 |
| 2,594,186 | Le Tourneau | Apr. 22, 1952 |